Aug. 30, 1938.  A. D. RIEHL  2,128,322
TIRE RIM
Filed Sept. 4, 1937
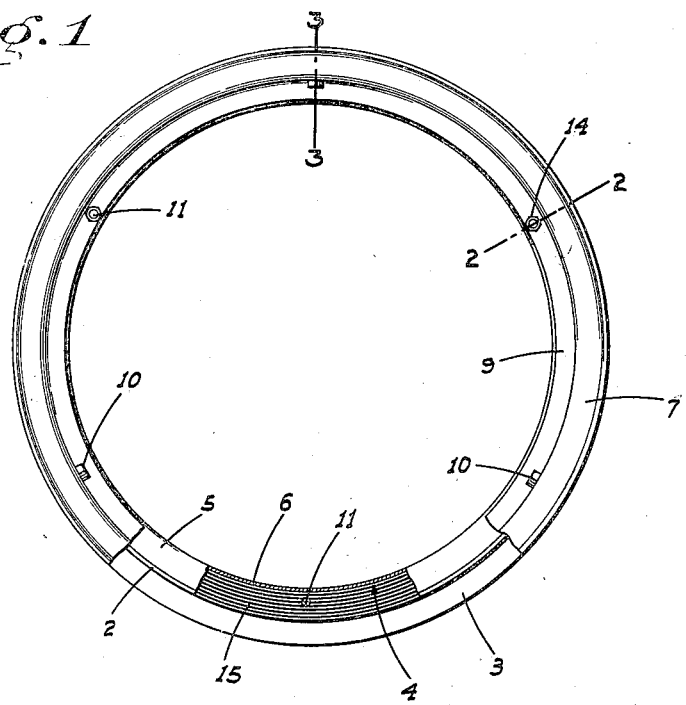
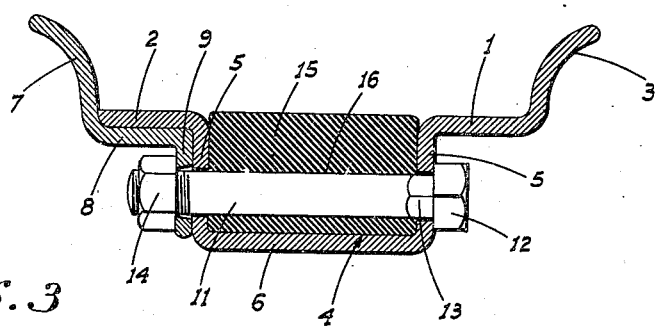
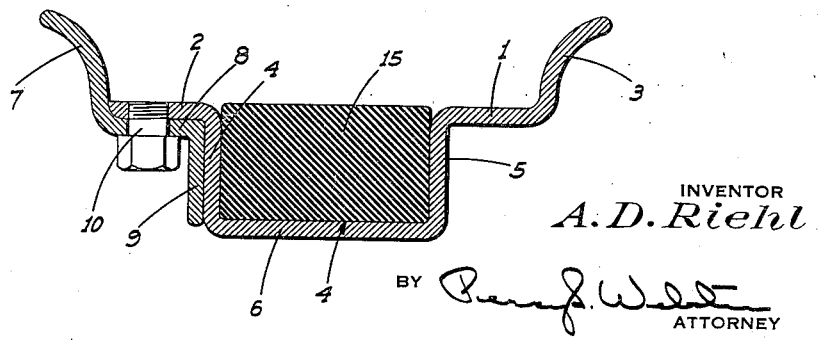
INVENTOR
A. D. Riehl
BY
ATTORNEY Patented Aug. 30, 1938

2,128,322

UNITED STATES PATENT OFFICE 2,128,322

TIRE RIM

Amos D. Riehl, Loomis, Calif.

Application September 4, 1937, Serial No. 162,495

5 Claims. (Cl. 152—396)

This invention relates to wheel mounting rims for pneumatic tires. My principal object is to provide a two-part rim adapted for use with the present standard form of tire, so constructed that placing of the tire on and the removal of the same from the rim is a much simpler operation than is possible with present rims. In addition there is no possibility of the tire coming off the rim in the event of a puncture or blow out as normally occurs with the drop center rims now almost universally used.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is an outer side view of the rim partly broken away and in section.

Figure 2 is a full size cross section on the line 2—2 of Fig. 1.

Figure 3 is a similar view on the line 3—3 of Fig. 1.

Referring now more particularly to the characters of reference on the drawing, the main member of the rim comprises a pair of transversely spaced inner and outer annular bands I and 2 respectively, forming ledges on which the beads of the tire rest. The band I has an outwardly projecting bead retaining flange 3 and is located on the inner side of the rim.

Between the bands the rim member is formed with a relatively deep channel 4 or "drop center" well, which is outlined by substantially parallel radial side walls 5 and a bottom wall 6, the latter forming the support for the spokes or disc of the wheel as usual.

The other member of the rim comprises the opposed bead retaining flange 7, which is formed on an annular band 8 separate from and adapted to overlap and engage the face of the band 2 opposite that on which the tire beads rest. The band 8 is also formed with a radial skirt 9 adapted to engage against the adjacent channel wall 5.

A plurality of evenly spaced cap screws 10 disposed radially of the rim extend through and detachably connect the bands 2 and 8 together. Spaced about the rim between the screws 10 are transversely extending bolts 11. These project through both walls 5 and across the well between, and also through the skirt 9. The heads 12 of the bolts engage the inner wall 5 or that adjacent the band 1, and the adjacent portion of the bolt is preferably squared as at 13 so that it cannot rotate in said wall. The nuts 14 on the bolts bear against the skirt 9 and clamp the same against the adjacent wall 5.

It will thus be seen that by removing the bead retaining flange 7, the tire beads may be slid on to or removed from the supporting bands 1 and 2 of the rim, without distorting or warping the tire as is necessary with the form of rim now used. This flange when then mounted in place, being secured by bolts and screws which extend both radially and transversely of the rim, is held so rigidly that it can adequately resist all pressure such as those set up by air pressure within the tire, as well as strains due to contact of the flange with any exterior obstruction.

Since a tire can now be slid on to the rim without distorting the same, the central channel or well formed between the bolt supporting walls 5 has no function such as it serves in the present form of one-piece rim. I therefore fill this well with an endless ring 15 so that a practically flush and unbroken surface is provided with and between the bands 1 and 2. This ring is preferably of a cheap grade of elastic material such as soft-reclaimed rubber, which may be stretched over the band 2 when mounting it in place, but may be of other material.

During its manufacture or molding, holes 16 are formed in this ring for the bolts 11. These holes are made undersize so that when the bolts are inserted therethrough they are gripped by the rubber about the holes. The value of this is to prevent the bolts from possibly moving lengthwise by pressing contact with the skirt 9 when the latter is being mounted in position, and which could easily occur if the bolt holes in the skirt were not initially lined up with the bolts.

Apart from serving as a filler and for bolt holding purposes, the soft rubber ring, having its outer surface smooth, provides a cushion against which the exposed portion of the inner tube of the tire, between the beads, bears. The tube is thus kept from contact with the sometimes rough and rusty metal of the rim, and the need of using a fabric flap is avoided.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire rim comprising an annular tire-bead supporting unit, a bead retaining flange about the inner side of the unit, said unit including an outer annular bead supporting band, and a wall transversely spaced from the outer edge of said band and extending radially of the rim toward the center thereof, another bead retaining flange opposed to said first named flange, an annular band formed with said other flange to engage the face of the band opposite the tire supporting face thereof, a radially extending skirt on said last named band to engage the outer face of said wall, spaced radially disposed cap screws to detachably secure said bands together, and transversely extending bolts disposed intermediate the cap screws and detachably securing said wall and skirt together.

2. A tire rim comprising a pair of transversely spaced annular bands to support the beads of a tire, a drop-center channel between the bands defined on the sides by walls extending radially inward from the adjacent edges of the bands, a bead retaining flange on one band, another bead retaining flange about but separate from the other band, a radial skirt integral with said other flange and bearing against the adjacent wall of the channel, bolts through both walls and said skirt, and nuts on the bolts engaging the skirt.

3. A rim as in claim 2, with a ringlike filler in the channel through which the bolts project.

4. A rim as in claim 2, with a filler in the channel having an outer smooth surface substantially flush with the bead engaging surface of the bands.

5. A rim as in claim 2, with a soft elastic rubber ring filling the channel, said ring having bolt holes of undersize relative to the bolts and through which the latter project.

AMOS D. RIEHL.